United States Patent
Baldock

(10) Patent No.: US 6,464,516 B2
(45) Date of Patent: *Oct. 15, 2002

(54) WIRING INTERCONNECTION SYSTEM

(75) Inventor: George M. Baldock, 929 W. Oakdale Ave., West Basement, Chicago, IL (US) 60657

(73) Assignee: George M. Baldock, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/503,891

(22) Filed: Feb. 15, 2000

(65) Prior Publication Data

US 2002/0002013 A1 Jan. 3, 2002

Related U.S. Application Data

(63) Continuation-in-part of application No. 09/156,445, filed on Sep. 18, 1998, which is a continuation-in-part of application No. 08/940,137, filed on Sep. 29, 1997, now Pat. No. 5,915,980.

(51) Int. Cl.[7] .............................................. H01R 25/00
(52) U.S. Cl. ....................... 439/120; 439/110; 439/119; 174/36
(58) Field of Search .................. 439/110, 113–121, 439/681, 578, 579, 580, 492–496; 174/36, 115, 117, 110, 121, 88 R, 84 R; 435/422, 435, 877, 610

(56) References Cited

U.S. PATENT DOCUMENTS

| | | | |
|---|---|---|---|
| 4,219,928 A | * 9/1980 | Kuo | 29/868 |
| 4,468,089 A | * 8/1984 | Brorein | 350/96 |
| 4,481,379 A | * 11/1984 | Bolick, Jr. et al. | 174/36 |
| 4,680,423 A | * 7/1987 | Bennett et al. | 174/36 |
| 4,746,767 A | * 5/1988 | Gruhn | 174/36 |
| 5,314,356 A | * 5/1994 | Isohata et al. | 439/681 |
| 5,342,204 A | * 8/1994 | Och | 439/39 |
| 5,521,331 A | * 5/1996 | Hillburn | 174/36 |
| 5,603,621 A | * 2/1997 | Elmouchi | 439/120 |

* cited by examiner

Primary Examiner—P. Austin Bradley
Assistant Examiner—Alexander Gilman
(74) Attorney, Agent, or Firm—Welsh & Katz, Ltd.

(57) ABSTRACT

A wiring interconnection system for interconnecting a plurality of electrical components. The wiring system is mountable to an external surface and includes an insulated cable. The insulated cable is shielded for use with RF transmission and provides a low profile when mounted to the external surface.

21 Claims, 7 Drawing Sheets

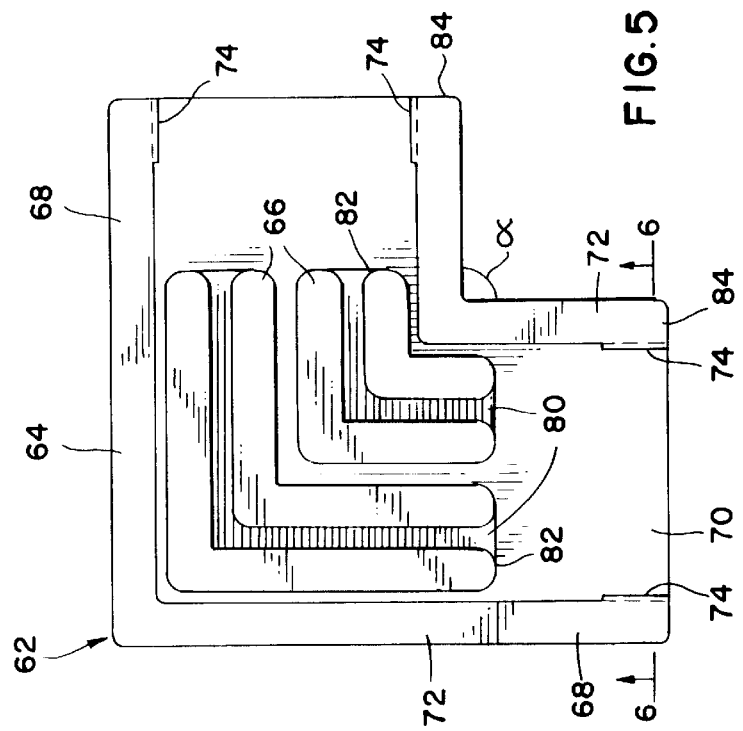
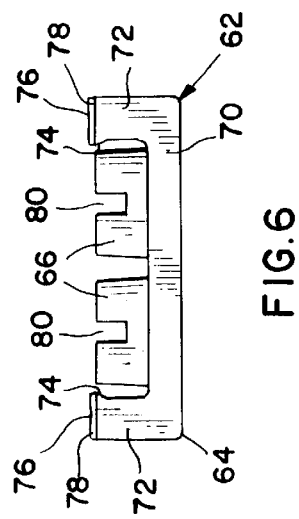
FIG.5
FIG.6
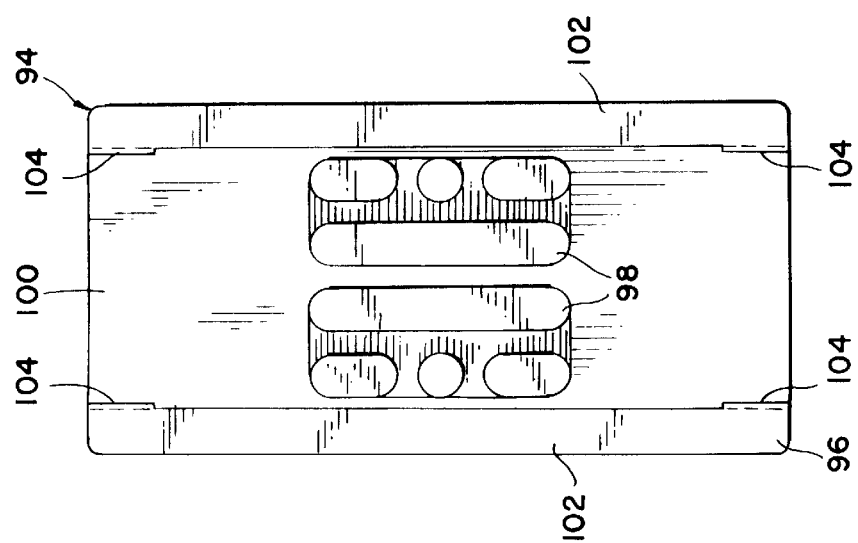
FIG.7

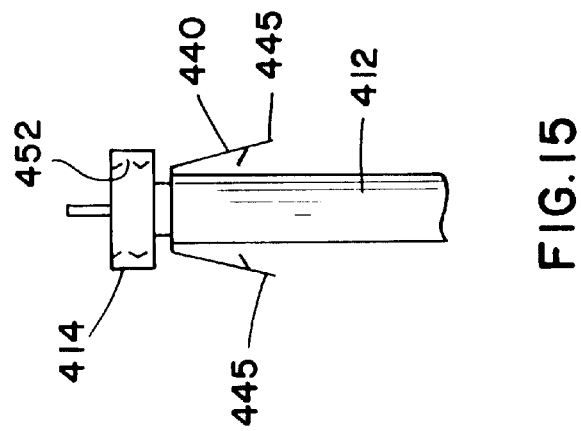
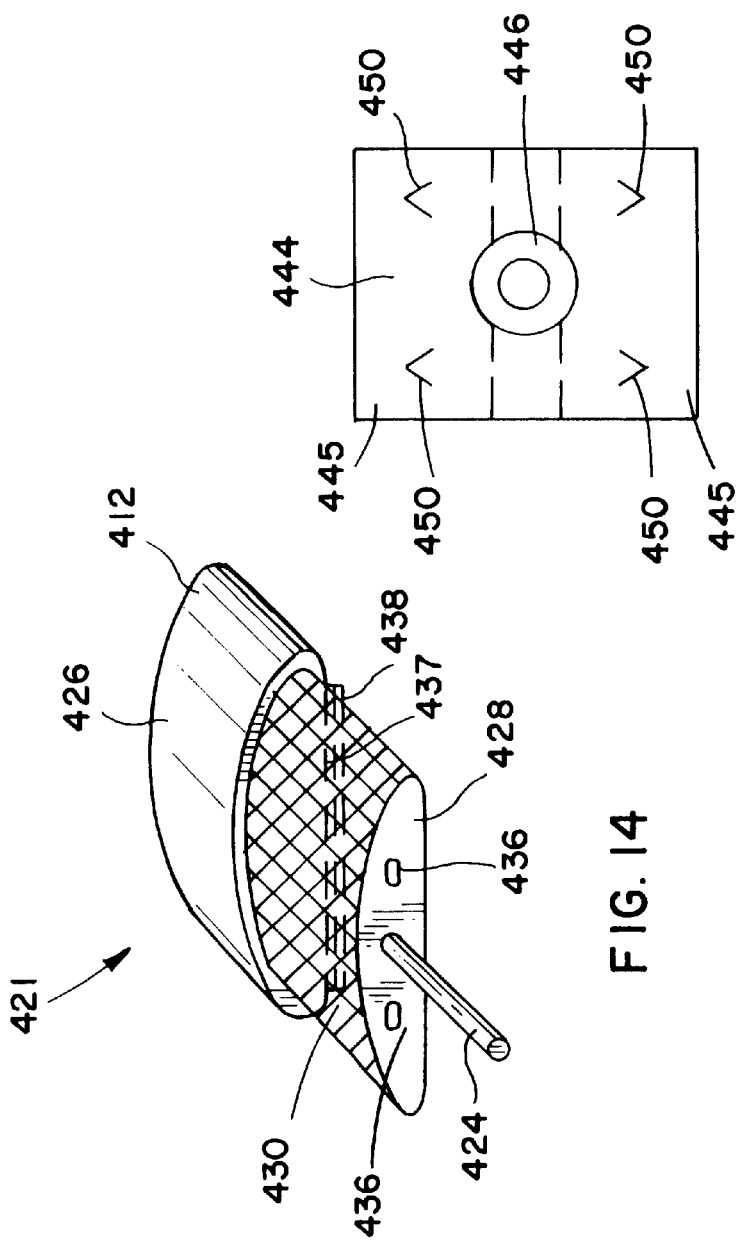

WIRING INTERCONNECTION SYSTEM

REFERENCE TO RELATED APPLICATIONS

The present application is a continuation-in-part of U.S. application Ser. No. 09/156,445, filed Sep. 18, 1998, now pending, which is a continuation-in-part of U.S. application Ser. No. 08/940,137, filed Sep. 29, 1997, now U.S. Pat. No. 5,915,980.

BACKGROUND OF THE INVENTION

The present invention relates generally to a wiring interconnection system. More particularly, the present invention relates to a wiring assembly for organizing and arranging wiring between electrical components, such as between stereo components and load speakers.

When interconnecting stereo components to loud speakers, long lengths of speaker wire are typically routed along the floor between the stereo components and the speakers. To permit future relocation of the speakers, the speaker wire is often selected with a length that is longer than needed.

Two to four speakers may be connected to the electronic components, and sophisticated home theater arrangements may include additional speakers. Such a plethora of cables creates an unsightly and disorganized "rats' nest" of cables, which detracts from the overall aesthetic appearance of the room.

Pollack, U.S. Pat. Nos. 4,454,374 and 4,563,542, disclose an electric cord holder having a U-shaped shell with a hinged or slotted covering. The cord holder is in the form of a partially open conduit having a longitudinal slot, and is configured to be secured to a wall by a chemical adhesive. An electrical cord from an appliance is inserted into the cord holder, and the cord holder is secured to the wall to protect the loose cord. However, the cord holder is not suitable arranged to interconnect multiple components, and is not adapted so that the wiring may be extended, as is required when connecting loud speakers to a receiver or amplifier.

Users wishing to hide the speaker cables have few choices. One solution is to "hide" the cables within the walls. However, this is expensive and is only suitable for permanent component placement. Another choice is to "wrap" the cables in a form of tubing or conduit described above. Moving the components to other locations requires the installation or removal of sections of the conduit. Additionally, the conduit is relatively bulky in appearance and is very noticeable, as it significantly protrudes from the wall.

SUMMARY OF THE INVENTION

The present invention is a wiring interconnection system for interconnecting a plurality of electrical components. The wiring system is mountable to an external surface such as a vertically oriented wall.

The wiring system includes a connecting module, an insulated cable, and a plug assembly. The connecting module has at least one connection terminal and is mountable to the external surface. The insulated cable has a body portion and at least one conducting element integrally formed within the body portion and is mountable to the external surface.

The insulated cable is removably coupled to the connecting module so that the conducting element engages the connection terminal. The plug assembly has at least one conducting element for operably connecting the connecting module to one of the electrical components.

BRIEF DESCRIPTION OF THE DRAWINGS

FIG. 5 is a bottom view of a splicing module for use with the wiring interconnection system.

FIG. 6 is a sectional view of the splicing module taken along a line 6—6 in FIG. 5.

FIG. 7 is a bottom view of an alternative embodiment of the splicing module.

FIG. 14 is a perspective view of yet another alternative embodiment of the insulated cable.

FIG. 15 is a side view of the connector partially attached to the insulated cable.

FIG. 16 is a plan view of a connector for use with the cable illustrated in FIG. 14.

DETAILED DESCRIPTION OF THE INVENTION

Figure 1:
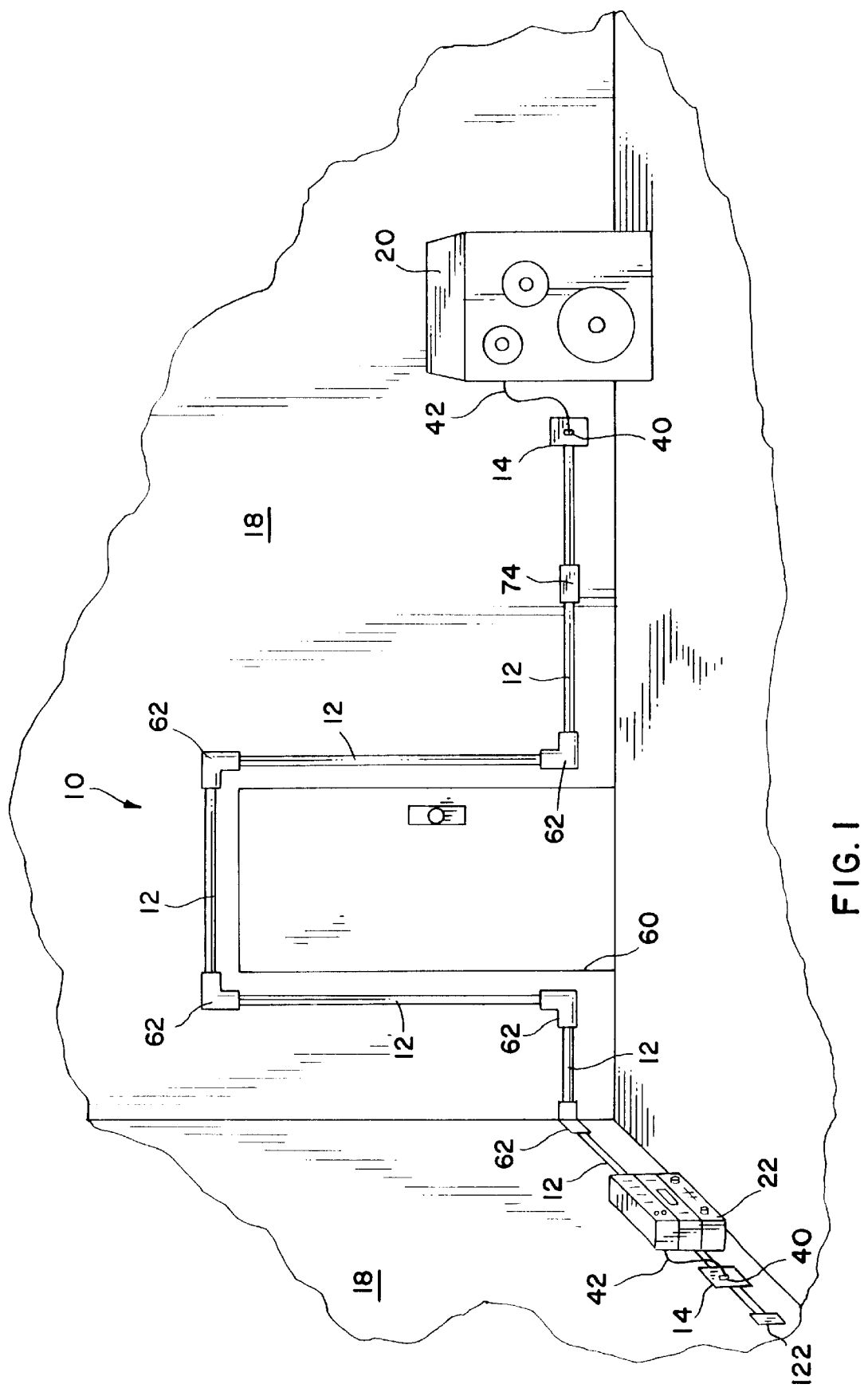
FIG. 1 is a perspective view of a preferred embodiment of a wiring interconnection system of the present invention.

The present invention is a wiring interconnection system, a preferred embodiment of which is illustrated at 10 in FIG. 1. The wiring system 10 generally includes a length of insulated cable 12 and a connecting module 14. The components of the wiring system 10 are removably attachable to an external surface, such as a vertically oriented wall 18 for interconnecting electronic components. The wiring system 10 can also be mounted to a ceiling or a floor, if desired.

The system 10 is preferably used to interconnect low-voltage electronic components. In a preferred embodiment, the wiring system 10 is used to connect loud speakers 20 to electronic components 22, such as an amplifier, tuner, receiver, or the like. However, the wiring system 10 may be used to interconnect high-voltage electronic components with suitable modification to the current carrying capability of the insulated cable 12 and parts attached thereto.

The insulated cable 12 and the connecting modules 14 have relatively low profiles that do not significantly extend from the surface of the wall 18. The wiring system 10 of the present invention thereby eliminates the cluttered appearance of multiple lengths of cables placed haphazardly on the floor, and provides an organized and aesthetically pleasing system for interconnecting the speakers 20 and the electronic components 22.

The wiring system 10 also permits the orientation and position of the components on the wall 18 to be easily changed when it is desired to relocate the speakers 20 and/or the electronic components 22. Additionally, user safety is increased because all cables are placed away from the floor where individuals could accidentally become tangled and trip, possibly resulting in injury.

The insulated cable 12 preferably has a generally rectangular cross-sectional profile and presents a relatively low profile when affixed to the wall 18. When the insulated cable 12 is used for attaching the speakers 20 to the electronic components 22, the insulated cable 12 preferably has a height of approximately three-eighths of an inch and a width of approximately one-eighth of an inch.

Figure 2:
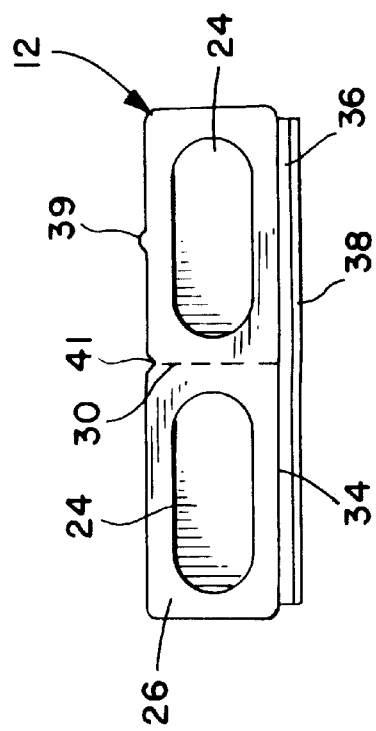
FIG. 2 is a sectional view of an insulated cable for use with the wiring interconnection system.

The insulated cable 12 preferably includes a pair of conducting elements 24 that are substantially encapsulated in a protective material 26, as most clearly illustrated in FIG. 2. To minimize the profile of the insulated cable 12, the conducting elements 24 preferably have an elongated shape.

While it is possible to form the conducting elements 24 from a variety of wire, the conducting elements 24 are preferably formed of braided copper wire. The braided wire at least partially resists separation of strands when attaching the insulated cable 12 to the connecting module 14. Another advantage of using the braided wire is that the insulated cable 12 may be readily bent into desired configurations. The conducting elements 24 are arranged in a spaced-apart orientation equidistant from a center line 30 of the insulated cable 12. This orientation facilitates coupling the insulated cable 12 to the connecting modules 14.

The protective material 26 may be formed using conventional coating techniques, such as extrusion and the like. The protective material 26 is formed of flexible plastic or rubber, such as poly vinyl chloride or any suitable insulating material. The protective material 26 is preferably selected with a color that approximates the color of the wall 18 or other surface to which the insulated cable 12 is mounted so as to minimize the conspicuousness of the insulated cable 12.

The insulated cable 12 includes at least one substantially flat surface 34 that is suitable for being placed adjacent to the wall 18. An adhesive material 36 is pre-applied to the surface 34 for removably attaching the insulated cable 12 to the wall 18. One preferred adhesive material 36 for use with the present invention is double-sided tape. The adhesive material 36 preferably has a protective backing 38 that may be removed by peeling off the backing 38 to expose the adhesive material 36. Once the protective backing 38 is removed, the insulated cable 20 is affixed to the wall 18 using finger pressure. Such a configuration permits the insulated cable 12 to be secured to the wall 18 in a quick and easy manner.

Opposite the surface 34, the insulated cable 12 preferably includes a polarity indication mechanism 39. The polarity indication mechanism 39 assists end users in connecting the wiring system 10 with correct polarity. The polarity indication mechanism 39 is preferably a ridge that extends above the surface of the protective material 26. A person of ordinary skill in the art will appreciate that it is possible to use other techniques for identifying the polarity of the conducting elements 24, such as painting a stripe on the protective material 26, without departing from the scope of the present invention.

Intermediate the conducting elements 24 the protective material 26 preferably includes a notch 41 formed therein. The notch 41 provides a weakened point in the insulated cable 12 and thereby allows the insulated cable 12 to be split into two portions when only a single conducting element 24 is needed. The notch 41 is preferably formed in the surface of the protective material 26 that is opposite surface 34.

The connecting module 14 preferably is mounted to the wall 18 at an end of the insulated cable 12, as most clearly illustrated in FIG. 1. A person of ordinary skill in the art will also appreciate that it is possible to use connecting modules 14 at intermediate locations along the insulated cable 12 when it is desired to establish multiple parallel connections, as may be desired if the wiring system 10 is used to connect computer equipment and the like.

The connecting module 14 provides at least one plug receiving mechanism 40 for use in connecting a plug assembly 42 between the insulated cable 12 and the speakers 20 as well as the electronic components 22. In a preferred embodiment, the connecting module 14 has a substantially rectangular configuration that is similar to the size of wall plates conventionally used with electrical switches and outlets.

Figure 4:
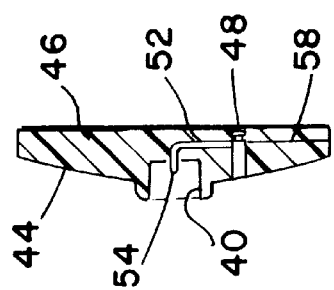
FIG. 4 is a sectional view of the connecting module taken along a line 4—4 in FIG. 3.

The connecting module 14 has an outer surface 44 and an inner surface 46, as most clearly illustrated in FIG. 4. The outer surface 44 preferably has an arcuate configuration that minimizes the conspicuousness of the connecting module 14. The outer surface 44 is selected with a color that approximates the color of the insulated wire 12. The inner surface 46 is preferably substantially flat so that the inner surface conforms to the wall 18.

The connecting module 14 includes at least one connection terminal 48 for removably attaching the insulated wire 12 to the connecting module 14. The connection terminals 48 preferably frictionally engage the conducting elements 24. A person of ordinary skill in the art will appreciate that it is possible to use a variety of connection terminals 48 without departing from the scope of the present invention. The number of connection terminals 48 is selected based on the number of conducting elements 24 in the insulated wire 12.

The outer surface 44 has a plug receiving mechanism 40 formed therein. The plug receiving mechanism 40 preferably has an oval shape. A person of ordinary skill in the art will appreciate that it is possible to use other shapes for the plug receiving mechanism 40 without departing from the scope of the present invention. The connecting module 14 includes conductive elements 52 that extend from the connection terminal 48 into the plug receiving mechanism 40 where the conductive elements 52 terminate with prongs 54. The conductive elements 52 provide conductive contact between the conducting elements 24 and an external connection such as the plug assembly 42, as illustrated in FIG. 1.

The inner surface 46 has a channel 58 formed therein. The channel 58 is selected with a height and width that approximates the height and width of the insulated cable 12. The channel 58 thereby allows the insulated cable 12 to be aligned with the inner surface 46 of the connecting module 14 so that the connecting module 14 may be positioned with the inner surface 46 along the wall 18.

When it is desired to route the insulated cable 12 around an object such as a door frame 60, a splicing module 62 is used, as most clearly illustrated in FIG. 1. The splicing module 62 generally includes an outer cover 64 and at least one conductive coupling element 66, as most clearly illustrated in FIGS. 5 and 6. The outer cover 64 has a profile that is substantially the same as the profile of the insulated cable 12. The outer cover 64 is preferably selected with a color that is approximately the same as the color of the protective material 26. This configuration provides the splicing module 62 with a non-conspicuous appearance that is similar to the appearance of the other components in the wiring system 10.

The splicing module 62 has two legs 68 that are oriented at an angle α with respect to each other, as most clearly illustrated in FIG. 5. The angle α between the legs 68 is preferably about 90 degrees when the splicing module 62 is used for routing wire around structures, such as a door frame having a similar configuration. A person of ordinary skill in the art will appreciate that it is possible to use other angles for routing insulated wire around differently shaped structures.

The outer cover 64 preferably includes a top portion 70, and a pair of side portions 72 that extend from the top portion 70 such that the outer cover 64 is substantially in the shape of the letter "U", as most clearly illustrated in FIG. 6. To assist retaining the outer cover 64 in engagement with the insulated cable 12, the outer cover 64 includes inwardly directed lips 74 that extend from the side portion 72 opposite the top portion 70.

Depending on the size and weight of the splicing module 62 and the size of the insulated cable 12, it may be desirable to apply an adhesive 76 to end surfaces 78 of the side portions 72 that are opposite the top portion 70. One preferred adhesive 76 for use with the present invention is double-sided tape, such as is used to attach the insulated cable 12 to the wall 18.

The conductive coupling elements 66 are attached to the top portion 70 intermediate the side portions 72. The number of conductive coupling elements 66 used in the splicing module 62 is selected based upon the number of conducting elements 24 in the insulated cable 12. The conductive coupling elements 66 include a channel recess 80 that is adapted to receive one of the conducting elements 24 at each end. The conductive coupling elements 66 are preferably fabricated from a conductive material, such as copper.

The conductive coupling elements 66 are attached to the outer cover 64 with an adhesive. Alternatively, the conductive coupling elements 66 may be at least partially molded into the outer cover 64. Ends 82 of the conductive coupling elements 66 are recessed from ends 84 of the outer cover 64 to prevent inadvertent contact with the conductive coupling elements 66 and exposed portions of the conducting elements 24, as most clearly illustrated in FIG. 6.

The conductive coupling elements 66 enable the conducting elements 24 to be moved into axial engagement. Alternatively, the conducting elements 24 may be moved radially into engagement with the conductive coupling element 66. The conductive coupling elements 66 thereby permit the conducting elements 24 to be readily attached and detached from the conductive coupling elements 66. However, a person of ordinary skill in the art will appreciate that it is possible to use other attachment mechanisms for conductively attaching the conducting elements 24 to the conductive coupling elements 66, such as using a wire nut, without departing from the scope of the present invention.

A person of ordinary skill in the art will appreciate that the splicing module 62 may also be used in a corner where two walls 18 join together. It is also possible to join together lengths of insulated wire in a linear configuration using a splicing module 94, as most clearly illustrated in FIG. 1.

The splicing module 94 includes an outer cover 96 and at least one conductive coupling element 98, as most clearly illustrated in FIG. 7. The outer cover 96 has a top portion 100 and a pair of side portions 102 extending therefrom. The conductive coupling elements 98 are mounted to the top portion 100 intermediate the side portions 102. Similar to the splicing module 62 illustrated in FIGS. 5 and 6, the splicing module 94 has inwardly directed lips 74 for retaining the splicing module 94 in engagement with the insulated cable 12.

Figure 9:
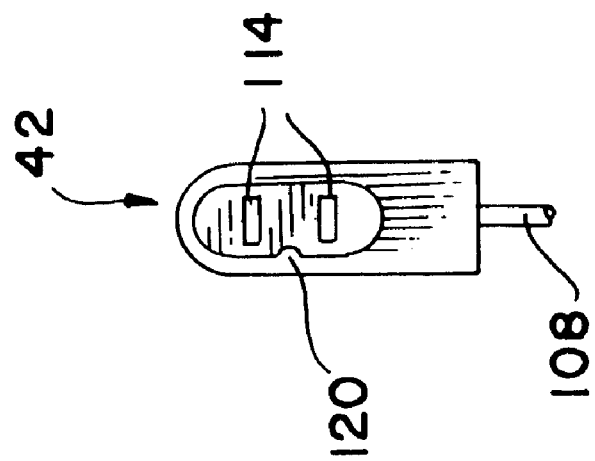
FIG. 9 is a front view of the plug assembly.
Figure 8:
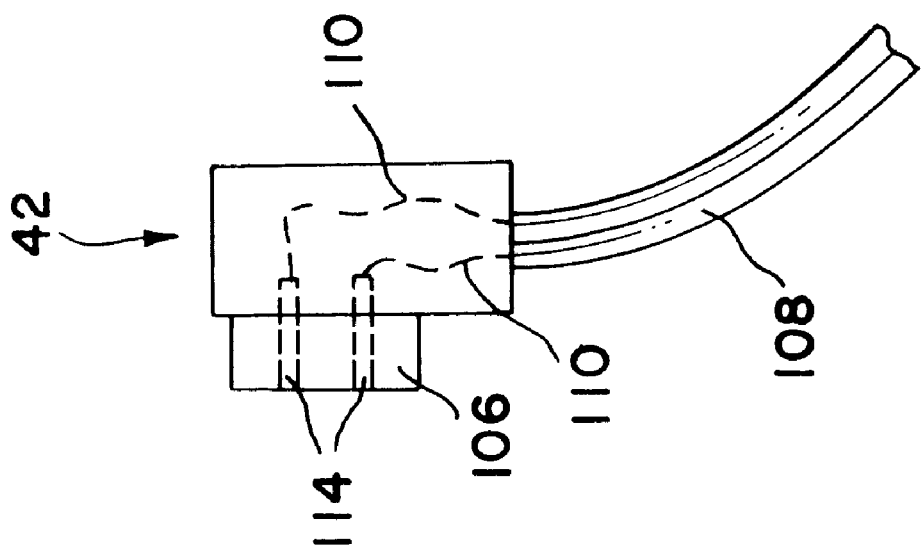
FIG. 8 is a side view of a plug assembly for use with the wiring interconnection system.

The plug assembly 42 operably connects the connecting module 14 to either the electronic component 22 or the speaker 20. The plug assembly 42 includes a modular plug 106 and a wire 108 attached thereto, as most clearly illustrated in FIGS. 8 and 9. The wire 108 has a pair of conducting elements 110 that are encased in an insulating coating 112.

The modular plug 106 includes two electrical contacts 114 that are attached to the wire 108. The modular plug 106 fits into the plug-receiving portion 40 on the connecting module 14 so that the blunt ends of the prongs 54 are received within electrical contacts 114 of the modular plug 106. The electrical contacts 114 may, for example, be hollow tube-like or rectangular connectors or clip-type connectors, or any other suitable contact mechanism configured to engage the blunt ends of the prongs 54.

Therefore, when the modular plug 106 is inserted into the plug-receiving portion 40, the wire 108 is electrically coupled to the conducting elements 110. Ends of the conducting elements 110 extending from wire 108 opposite the modular plug 106 are connected to the electronic component 22 or the speaker 20.

The modular plug 106 preferably includes a key or recess 120 disposed along a portion of the modular plug 106 that extends into the plug receiving portion 40. The key 120 allows the modular plug 106 to be inserted into the plug-receiving portion 40 in only one direction.

One connecting module 14 is mounted to the wall 18 proximate the electronic component 22, and another connecting module 14 is mounted to the wall 18 proximate the speaker 20. Each of the connecting modules 14 are connected via plug assembly 42 having a relatively short length of coiled wire to the electronic component 22 or the speaker 20. Thus, it can be seen that one insulated cable 12 in conjunction with two connecting modules 14 and two relatively short lengths of coiled wire permit the speakers 20 to be neatly and concisely connected to the electronic component 22. Additional speakers 20 may be connected to the electronic component 22 in a similar manner.

In a typical installation, the electronic component 22 is disposed between two speakers 20. Therefore, each insulated cable 12, with its attendant connecting modules 14, extend in opposite directions beginning at the location of the electronic component 22, and extending toward the speaker 20. However, in some installations, both speakers 20 may be located on one side of the electronic component 22. In this case, a second insulated cable is mounted adjacent the first insulated cable and includes its attendant connecting modules 14. If the end of the insulated cable 12 extends past the end of the connecting module 14, a "dummy" end cap 122 may be mounted to the end of the insulated cable 12 for aesthetic reasons, as illustrated in FIG. 1.

Of course the present invention is not limited to connecting speakers 14 to electronic components 12, and may be used to interconnect any electronic component to any other electronic component, such as telephone type devices, which require a cable having at least four conductors. Further, the insulated cable 12 is not limited to a specific number of conducting elements. Any number of conducting elements may be included, such as in a system used to interconnect computer components.

Figure 10:
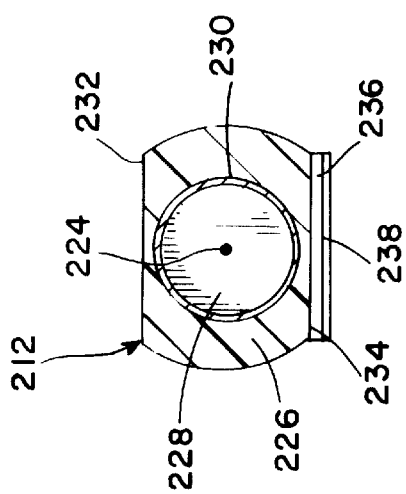
FIG. 10 is a sectional view of an alternative embodiment of the insulated cable.
Figure 17:
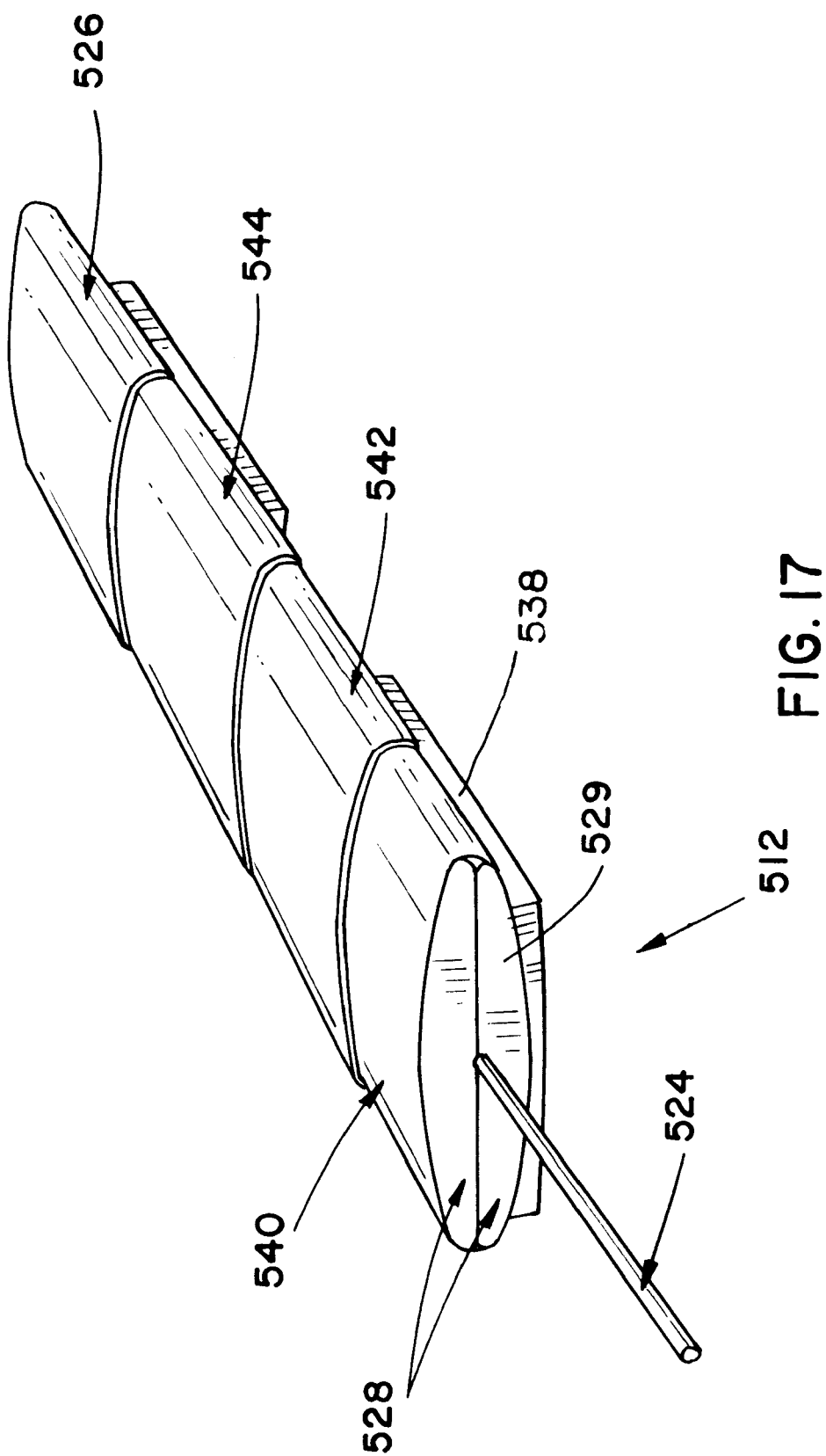
FIG. 17 is a perspective view of another embodiment of the insulated cable of the present invention.

For example, the wiring system may be adapted for use with coaxial cable, which is typically used with cable television. An insulated cable 212 includes a central conducting element 224, an intermediate insulating layer 228, a outer conducting element 230, and an outer insulating material 226, as most clearly illustrated in FIG. 10. To minimize the conspicuousness of the insulated cable 212, the insulated cable 212 preferably has a substantially flat outer flat surface 232 and a substantially flat inner surface 234. To affix the insulated cable 212 to a wall, an adhesive material 236 is provided on the inner surface 234. A removable backing 238 is preferably placed over the adhesive material 236 to protect the adhesive material 236 prior to use.

Figure 3:
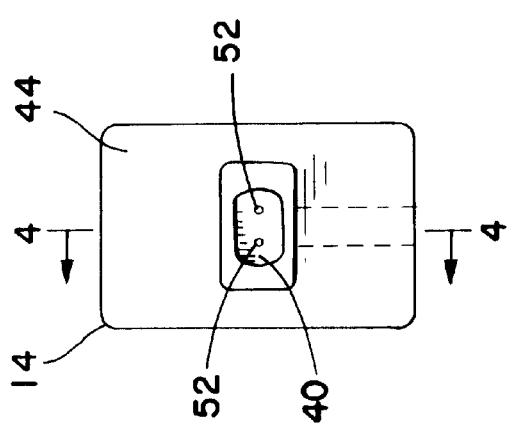
FIG. 3 is a front view of a connecting module for use with the wiring interconnection system.
Figure 11:
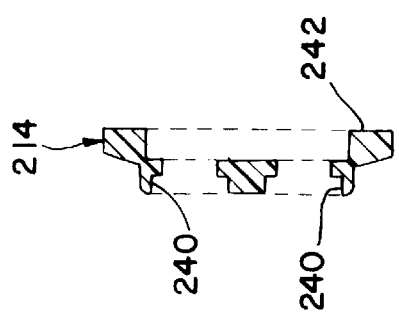
FIG. 11 is a sectional view of alternative embodiment of the connecting module for use with the insulated cable illustrated in FIG. 10.

A connecting module 214 used in this embodiment has a shape that is similar to the connecting module 14 illustrated in FIGS. 3 and 4. However, the connecting module 214 preferably includes a pair of sockets 240, as most clearly illustrated in FIG. 11. The sockets 240 are each adapted to receive a conventional coaxial connector (not shown). The connecting module 214 is removably attached to a wall using an adhesive material 242.

Figure 12:
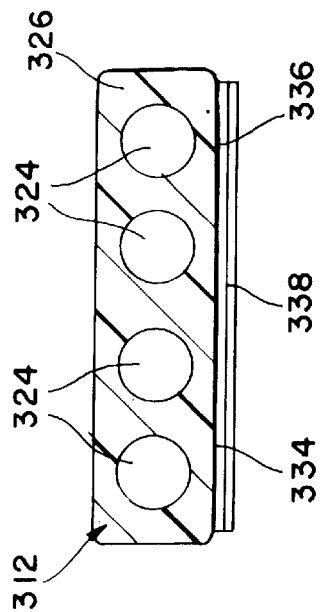
FIG. 12 is a sectional view of yet another embodiment of the insulated cable.

In yet another embodiment, the wiring system may be used for routing telephone cable. Depending on the type of telephone service, it is possible for an insulated cable 312 to include two or four conducting elements 324, as most clearly illustrated in FIG. 12. Because of the relatively small size of the conducting elements conventionally used in telephone cable, the conducting elements 324 may have a substantially circular profile. The conducting elements 324 are preferably substantially aligned in the insulated cable 312. The conducting elements 324 are covered with an insulating material 326, which is similar to the insulating material used in the insulated cable illustrated in FIG. 2.

The insulated cable 312 preferably has a substantially flat outer surface 332 and a substantially flat inner surface 334. To affix the insulated cable 312 to a wall, an adhesive material 336 is provided on the inner surface 334. A removable backing 338 is preferably placed over the adhesive material 336 to protect the adhesive material 336 prior to use.

Figure 13:
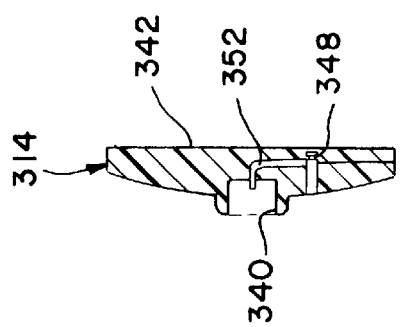
FIG. 13 is a sectional view of yet another embodiment of the connecting module for use with the insulated cable illustrated in FIG. 12.

A connecting module 314 used in this embodiment has a shape that is similar to the connecting module 14 illustrated in FIGS. 3 and 4. The connecting module 314 includes a socket 340, as most clearly illustrated in FIG. 13. The socket 340 is preferably shaped to receive a conventional telephone cable such as is available under the designation RJ-11. The connecting module 314 has at least one connection terminal 348 that is in communication with a conductive element 352 within the socket 340 for conductively coupling the insulated cable 312 to a telephone cord (not shown) through the socket 340. The connecting module 314 is removably attached to a wall using an adhesive material 342.

In yet another embodiment of the present invention, the wiring system includes a low profile coaxial insulated cable 412, as most clearly illustrated in FIG. 14. The insulated cable 412 includes a central conducting element 424, an intermediate insulating layer 428, an outer conducting element 430, and an outer insulating material 426.

The intermediate insulating layer 428 has a width that is substantial longer than a height to reduce the perceived profile of the insulated cable 412. Preferably, a lower surface 432 of the insulating layer 428 is substantially flat so that the insulated cable 412 will conform with the wall (not shown) to which the insulated cable 412 is attached. An upper surface 434 of the insulating layer 428 preferably has an arcuate shape to further reduce the perceived profile of the insulated cable 412.

The outer conducting element 430 substantially covers the insulating layer 428. The outer conducting element 430 is preferably formed from braided copper. The type of braided copper is selected to shield the central conductor 424 from undesirable interference.

The outer insulating layer 426 substantially covers the outer conducting element 430 and thereby protects the components of the insulated cable 412 from being damaged. The outer insulating layer 426 is preferably formed from polyvinyl chloride, which is extruded over the outer conducting element 430.

To affix the insulated cable 412 to a wall, an adhesive material 437 is provided on the lower surface 432. A removable backing 438 is preferably placed over the adhesive material 437 to protect the adhesive material 437 prior to use.

To further enhance the utility of the insulated cable 412 of this embodiment, the insulated cable 412 also preferably includes additional conducting elements 436 that are placed at intermediate positions in the insulating layer 428. While illustrated as only containing two conducting elements 436, a person of ordinary skill in the art will appreciate that it is possible to use other numbers of conducting elements 436 depending on the intended use of the insulated cable 412. Preferably one of the conducting elements 436 is placed on either side of the central conductor 424.

The conducting elements allow the insulated cable 412 to be also used for powering the operation of speakers or telephones. Care must be taken regarding the type of use for the conducting elements 436 so that the conducting elements 436 do not product interference that detrimentally affects the performance of the central conductor 424.

A connecting module 414 engages an end of the insulated cable 412, as most clearly illustrated in FIG. 15. The connecting module 414 is configured to conform with the outer insulating material 426 when the connecting module 414 is attached to the insulated cable 412.

The connecting module 414 generally includes two components: a retaining portion 440 for engaging the insulated cable 412 and a removable attachment portion 442 for attaching the connecting module 414 to other components (not shown). The retaining portion 440 is preferably fabricated from a main body 444, as most clearly illustrated in FIG. 16.

The main body 444 has circular aperture 446 formed therein through which the main body 444 is attached to the attachment portion 442. To assist in retaining the main body 444 at a desired position on the insulated cable 412, the main body 444 has a plurality of teeth 450 formed therein. When ends 445 of the main body 444 are folded adjacent to the insulated cable 412, the teeth 450 extend into the outer insulating layer 426 and retain the connecting module 414 on the insulated cable 412.

The attachment portion 442 is rotatably connected to the retaining portion 440. While it is possible to utilize a friction fit for attaching the connecting module 414 to other components, the attachment portion 442 preferably includes a threaded inner surface 452.

Still another embodiment of the present invention is directed to a low profile coaxial insulated cable 512. The low profile cable 512 provides sufficient shielding so that the low profile cable 512 may be used with 75 ohm service similar to conventional coaxial cable. The low profile cable 512 also provides sufficient shielding so that the low profile cable may be used with the transmission of digital signals.

The low profile cable 512 has a thickness of approximately 0.05 inches. While it is possible for the low profile cable 512 to have a width that is approximately the same as the height, the width is preferably between about 0.25 and 0.50 inches to enhance the ability of removably securing the low profile cable 512 to a wall surface (not shown) using an adhesive.

The low profile cable 512 includes a central conductor 524, which is preferably fabricated from copper and has a thickness of approximately 20 gauge. An intermediate insulating layer 528 is formed over the central conductor 524. The intermediate insulating layer 528 is preferably formed from two pieces 529 of flexible poly vinyl chloride ("PVC") that are adhesively adhered to each other. Each of the PVC pieces 529 preferably has a thickness of approximately 0.016 inches. To further reduce the profile of the low profile cable 512, the PVC pieces 529 are tapered so that a thickness of the PVC pieces 529 is smaller proximate edge surface of the PVC pieces 529.

Alternatively, the intermediate insulating layer 528 may be formed from gas injected foam. In this configuration the intermediate insulating layer 528 has a thickness of about 0.016 inches where the central conductor 524 extends through the intermediate insulating layer 528.

A first shielding layer 540 is applied of the intermediate insulating layer 528 so that the first shielding layer 540 substantially covers the intermediate insulating layer 528. The first shielding layer 540 is preferably fabricated from aluminum or mylar and has a thickness of approximately 0.001 inches.

A second shielding layer 542 is preferably applied over the first sheilding layer 540 so that the second shielding layer 542 substantially covers the first shielding layer 540. The second shielding layer 542 is preferably fabricated from PVC and has a thickness of approximately 0.008 inches. It is particularly desirable to use the second shielding layer 542 when the low profile cable 512 is used for the transmission of digital signals.

A third shielding layer 544 is preferably applied over the second shielding layer 542 so that the third shielding layer 544 substantially covers the second shielding layer 542. The third shielding layer 544 is preferably fabricated from a copper sheet and has a thickness of approximately 0.001 inches. The third shielding layer 544 is particularly useful to provide EMI shielding.

An outer insulating layer 526 substantially covers the third shielding layer 544 and thereby protects the components of the insulated cable 512 from being damaged. The outer insulating layer 526 is preferably formed from polyvinyl chloride, which is extruded over the third shielding layer 544.

Specific embodiments of a wiring interconnection assembly according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A wiring interconnection system for interconnecting a plurality of electrical components, wherein the wiring system is mountable to an external surface, the wiring system comprising:

a connecting module having at least one connection terminal, wherein the connecting module is mountable to the external surface;

the connecting module comprising a main generally flat front body defining at least one generally circular aperture in a central portion and generally flat portions, extending rearward from and substantially perpendicular to the front body, and having at least one retaining projection to retain an insulated cable;

the insulated cable having a body portion and at least one conducting element integrally formed within the body portion, wherein the insulated cable is removably coupled to the connecting module so that the conducting element engages the connection terminal and wherein the insulated cable is mountable is shielded for transmission of RF, the insulated cable comprising;

central conductor;

an intermediate insulating layer that substantially covers the central conductor;

a first discrete shielding layer comprising a generally uniform electrically conductive material that substantially covers the intermediate insulating layer and shields the central conductor from RFI;

a second discrete shielding layer comprising a generally uniform electrically conductive material that substantially covers the first shielding layer and shields the central conductor from EMI; and an outer insulating layer that substantially covers the second shielding layer and protects the insulated cable from damage by external forces, wherein the insulated cable has a noncircular cross-section and a thickness of less than about 0.10 inches, wherein the insulated cable is mountable to the external surface.

2. The wiring system of claim 1, wherein the insulated cable has a width of between about 0.25 inches and 0.50 inches.

3. The wiring system of claim 1, and further comprising an adhesive material affixed to a surface portion of the insulated cable to facilitate mounting the insulated cable to the external surface.

4. The wiring system of claim 3, and further comprising a removable protective backing affixed to the adhesive material configured to be removed from the adhesive material to facilitate affixing the insulated cable to the external surface.

5. The wiring system of claim 1, wherein the intermediate insulating layer is formed from poly vinyl chloride, gas injected foam or combinations of both.

6. The wiring system of claim 5, wherein the intermediate insulating layer has a thickness of about 0.016 inches.

7. The wiring system of claim 1, wherein the first shielding layer is fabricated from aluminum or mylar film.

8. The wiring system of claim 7, wherein the first shielding layer has a thickness of about 0.001 inches.

9. The wiring system of claim 1, wherein the second shielding layer is fabricated from copper film.

10. The wiring system of claim 9, wherein the second shielding layer has a thickness of about 0.001 inches.

11. The wiring system of claim 1, wherein the outer insulating layer is formed from poly vinyl chloride.

12. The wiring system of claim 11, wherein the outer insulating layer has a thickness of about 0.008 inches.

13. The wiring system of claim 1, wherein the connecting module includes a cable receiving recess formed therein, wherein the cable receiving recess is configured to releasable retain at least one insulated cable and maintain alignment between the insulated cable conducting element and the connection terminal.

14. The wiring system of claim 13, wherein the cable receiving recess includes an inside surface and side portions that are configured to align the at least one insulated cable relative to the cable receiving recess.

15. The wiring system of claim 1, wherein the insulated cable further includes a polarity indication mechanism.

16. The wiring system of claim 15, wherein the polarity indication mechanism is a ridge extending from the body portion.

17. The wiring system of claim 1, wherein the insulated cable further includes a separation mechanism that permits one of the conducting elements to be separated from the other conducting elements.

18. The wiring system of claim 17, wherein the separation mechanism is a notch formed in the body portion.

19. The wiring system of claim 1, and further comprising a third shielding layer intermediate the first shielding layer and the second shielding layer.

20. The wiring system of claim 19, wherein the third shielding layer is fabricated from poly vinyl chloride.

21. The wiring system of claim 20, wherein the third shielding layer has a thickness of approximately 0.008 inches.

* * * * *